United States Patent
Aaron et al.

(10) Patent No.: US 7,487,084 B2
(45) Date of Patent: Feb. 3, 2009

(54) APPARATUS, PROGRAM STORAGE DEVICE AND METHOD FOR TESTING SPEECH RECOGNITION IN THE MOBILE ENVIRONMENT OF A VEHICLE

(75) Inventors: Andrew Aaron, Ardsley, NY (US); Subrata K. Das, Granite Springs, NY (US); David M. Lubensky, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 10/210,667

(22) Filed: Jul. 31, 2002

(65) Prior Publication Data

US 2003/0236672 A1 Dec. 25, 2003

Related U.S. Application Data

(60) Provisional application No. 60/341,504, filed on Oct. 30, 2001.

(51) Int. Cl.
*G10L 15/00* (2006.01)

(52) U.S. Cl. ........................ 704/231; 704/270; 704/275; 704/251; 704/228; 704/233

(58) Field of Classification Search ................. 704/231, 704/233, 251, 228, 275, 270
See application file for complete search history.

(56) References Cited

U.S. PATENT DOCUMENTS

| | | | | |
|---|---|---|---|---|
| 4,856,072 A | * | 8/1989 | Schneider et al. | 381/86 |
| 4,862,363 A | * | 8/1989 | Krisher et al. | 701/59 |
| 5,715,369 A | * | 2/1998 | Spoltman et al. | 704/270 |
| 5,729,658 A | * | 3/1998 | Hou et al. | 704/270 |
| 5,835,565 A | * | 11/1998 | Smith et al. | 379/27.04 |
| 6,067,513 A | * | 5/2000 | Ishimitsu | 704/233 |
| 6,091,802 A | * | 7/2000 | Smith et al. | 379/10.03 |
| 6,219,640 B1 | * | 4/2001 | Basu et al. | 704/246 |
| 6,243,685 B1 | * | 6/2001 | Welch et al. | 704/276 |
| 6,449,594 B1 | * | 9/2002 | Hwang et al. | 704/233 |
| 6,943,703 B2 | * | 9/2005 | Rubenstein | 340/988 |
| 2002/0069064 A1 | * | 6/2002 | Dejaco et al. | 704/270 |
| 2002/0077819 A1 | * | 6/2002 | Girardo | 704/260 |

(Continued)

FOREIGN PATENT DOCUMENTS

JP 01094398 A * 4/1989

OTHER PUBLICATIONS

Moreno et al. "Sources of Degradation of Speech Recognition in the Telephone Network", ICASSP-94, IEEE International Conference on Acoustics, Speech, and Signal Processing, Apr. 19-22, 1994, vol. 1, pp. I/109-I/112.*

*Primary Examiner*—Vijay B Chawan
(74) *Attorney, Agent, or Firm*—Ference & Associates LLC

(57) ABSTRACT

A testing arrangement provided for speech recognition systems in vehicles. Preferably included are a "mobile client" secured in the vehicle and driven around at a desired speed, an audio system and speaker which plays back a set of prerecorded utterances stored digitally in a computer arrangement such that the speech of a human being is simulated, transmission of the speech signal to a server, followed by speech recognition and signal-to-noise ratio (SNR) computation. Here, the acceptability of the vehicular speech recognition system is preferably determined via comparison with prespecified standards of recognition accuracy and SNR values.

19 Claims, 6 Drawing Sheets

U.S. PATENT DOCUMENTS

| | | | |
|---|---|---|---|
| 2002/0097884 A1* | 7/2002 | Cairns | 381/71.4 |
| 2003/0069727 A1* | 4/2003 | Krasny et al. | 704/228 |
| 2004/0117183 A1* | 6/2004 | Deligne et al. | 704/248 |
| 2005/0197836 A1* | 9/2005 | Cohen et al. | 704/251 |

* cited by examiner

APPARATUS, PROGRAM STORAGE DEVICE AND METHOD FOR TESTING SPEECH RECOGNITION IN THE MOBILE ENVIRONMENT OF A VEHICLE

CLAIM FOR PRIORITY

This application claims priority from U.S. patent application Ser. No. 60/341,504, filed on Oct. 30, 2001, and which is hereby incorporated by reference as if fully set forth herein.

FIELD OF THE INVENTION

The present invention relates generally to speech recognition systems, and particularly to the testing of speech recognition systems used in vehicles.

BACKGROUND OF THE INVENTION

Speech recognition technology, such as that developed by the IBM Corporation, has hitherto been finding its way into automotive applications. For instance, ATX Technologies, a telematics company based in Dallas, is incorporating 113M speech recognition system in Mercedes-Benz cars. In such a typical setup, the speech input is picked up by a microphone mounted on the ceiling of the car halfway between the driver and the front passenger positions and transmitted by a cellular channel to a remote server where the recognition takes place. The outcome of the recognition, e.g., a reply to an inquiry regarding a stock quotation, is typically generated by a text-to-speech synthesizer at the server and transmitted back to the vehicle via the cellular network as well.

An evolving need has been recognized in connection with being able to test conveniently the performance of this type of vehicular speech recognition setup. Just as car manufacturers routinely carry out quality control testing on the conventional components of a car, such as the air-conditioning unit or the ignition system, a need has oft been recognized in connection with subjecting to a given test regimen speech recognition systems such as those installed in vehicles. For example, a manufacturer could specify that speech recognition performance be checked on every one-hundredth vehicle or so coming out of the assembly line. This could thus confirm that manufacturing or installation defects are not compromising the quality of the recognition system.

Conventional test procedures have hitherto involved the recruitment of a pool of speakers who are driven in the test vehicle while they read a fixed script. The data are then transmitted to the server where speech recognition and signal-to-noise ratio (SNR) computation are carried out to determine performance quality. There are a number of disadvantages to this process, however. Each vehicle to be tested needs to use a pool of speakers, likely making the process quite expensive. A separate person is needed to drive the vehicle, adding to the expense. If the set of speakers also changes from one test to another, the results will not be readily comparable to each other, as speaker variations will inevitably be introduced. Even if the speaker set is fixed, some inter-speaker variations are unavoidable from one trial to another, making the results difficult to compare and standardize. Other disadvantages, such as speaker error in reading the designated script, can potentially compound the aforementioned problems.

In view of the foregoing, a need has been recognized in connection with providing testing arrangements which overcome the shortcomings and disadvantages presented by conventional arrangements.

SUMMARY OF THE INVENTION

In accordance with at least one presently preferred embodiment of the present invention, an apparatus, program storage device, and method are broadly contemplated herein for speech recognition systems in vehicles that involves a "mobile client" secured in the vehicle and driven around at a desired speed, an audio system and speaker which plays back a set of prerecorded utterances stored digitally in a computer arrangement such that the speech of a human being is simulated, transmission of the speech signal to a server, followed by speech recognition and signal-to-noise ratio (SNR) computation. Here, the acceptability of the vehicular speech recognition system is preferably determined via comparison with pre-specified standards of recognition accuracy and SNR values.

In summary, the present invention provides, in one aspect, an apparatus for testing speech recognition in a vehicle, said apparatus comprising: a speaker arrangement which propagates speech output; a testing arrangement adapted to test the accuracy of speech input associated with the speech output propagated by said speaker arrangement; wherein said speaker arrangement is configured to simulate the propagation of a human voice.

In another aspect, the present invention provides a method of testing speech recognition in a vehicle, said method comprising: propagating speech output; testing the accuracy of speech input associated with the speech output propagated by said speaker arrangement; and wherein said propagating step comprises simulating the propagation of the human voice.

Furthermore, in an additional aspect, the present invention provides a program storage device readable by machine, tangibly embodying a program of instructions executable by the machine to perform method steps for testing speech recognition in a vehicle, said program storage device comprising: propagating speech output; testing the accuracy of speech input associated with the speech output propagated by said speaker arrangement; and wherein said propagating step comprises simulating the propagation of human voice.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Broadly contemplated herein is a system referred to herebelow as "Robotalk".

Figure 1:
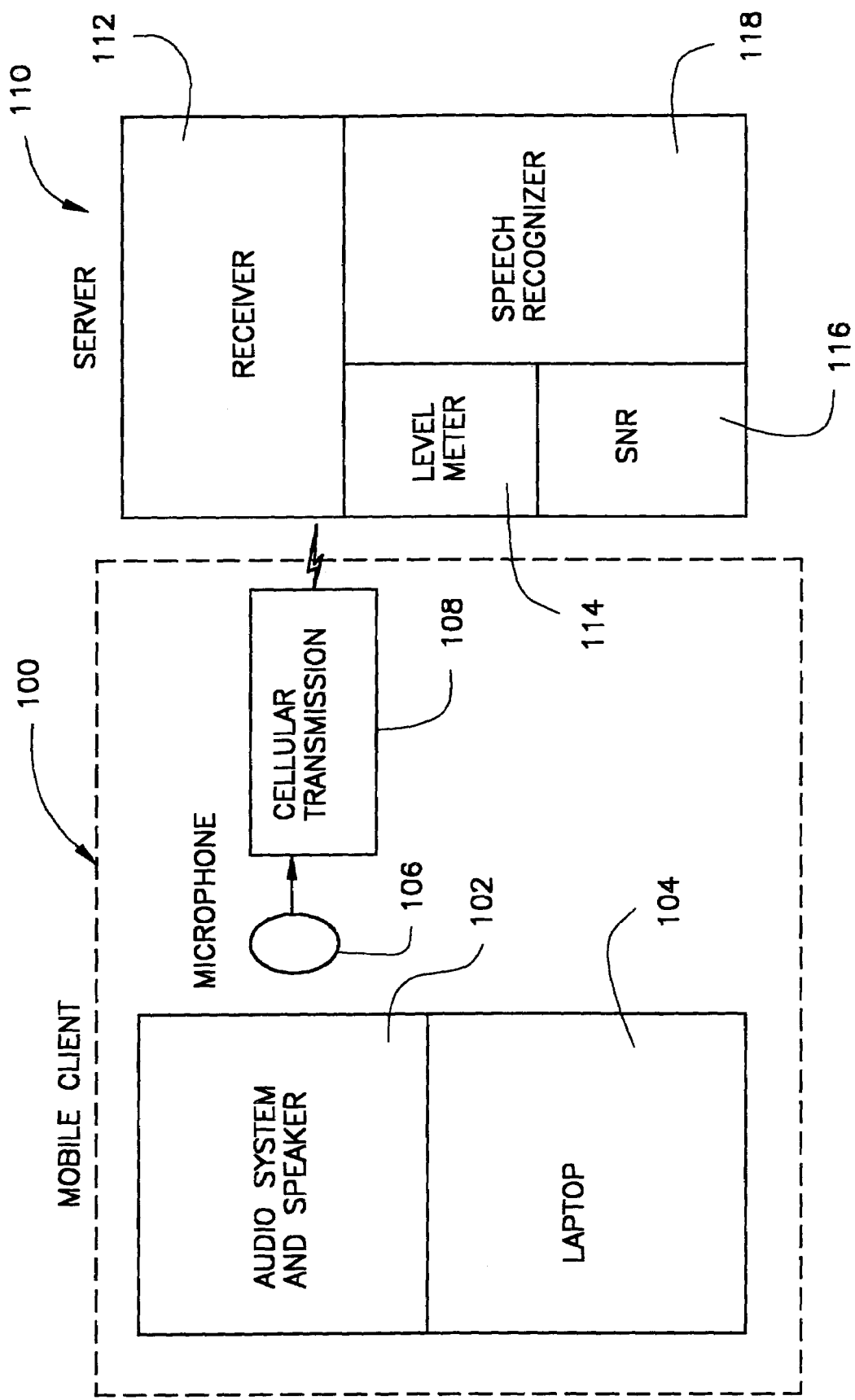
FIG. 1 schematically illustrates components of a testing arrangement.

A schematic of a Robotalk setup is shown in FIG. 1. Generally, "mobile client" 100 is preferably secured in a vehicle and driven around at a desired speed. Audio system and speaker 102 is preferably configured to play back a set of prerecorded utterances stored digitally in a computer such as laptop 104, and preferably does so in such a manner as to simulate the speech of a human being. This speech signal is preferably picked up by a microphone 106 and transmitted, e.g., via a cellular transmission unit 108, to a server 110 preferably positioned somewhere separate from the vehicle. Speech recognition and signal-to-noise ratio (SNR) computation are preferably carried out at the server 110 (at speech recognizer 118 and SNR computation arrangement 116, respectively) and the acceptability of the vehicular speech recognition system is preferably determined via comparison with pre-specified standards of recognition accuracy and SNR values. If desired, the recognition accuracy score and the SNR value could be sent back to the vehicle using speech synthesis and cellular transmission.

The function of receiver 112 and level meter 114 will be better understood from further description provided herebelow.

The laptop 104 could conceivably be replaced by any other suitable substitute, such as any conveniently sized digital computer, a CD player, or any other line-level signal source.

It should be noted that the concept of playing back prerecorded speech to simulate human voice was successfully employed during the compilation of the NTIMIT database, available from the National Institute of Standards and Technology. The NTIMIT was derived from the TIMIT corpus, a collection of high-fidelity voice recordings, passing the TIMIT data through several NYNEX telephony networks. (The name "TIMIT" derives from TI [Texas Instruments] and MIT [Massachusetts Institute of Technology], the two organizations mainly responsible for the TIMIT database. "NTIMIT" stands for "Network TIMIT" and was developed by NYNEX. It is discussed in the following paper: C. Jankowski, A. Kalyanswamy, S. Basson & J. Spitz, "NTIMIT: A Phonetically Balanced, Continuous Speech, Telephone Bandwidth Speech Database", Proc. Intl. Conf. On Acoustics, Speech and Signal Proc., pp. 109-111, April 1990).

The acoustic specifications of the audio system and speaker 102, preferably aided by the calibration procedure described herebelow, may be such that its speech output has the same volume level, tone, quality and frequency response as that of a human being speaking in the front seat of a vehicle when measured by a microphone attached to the vehicle's rear-view mirror. Physically, the audio system and speaker 102 may be shaped and sized like a human torso, with the speaker being mounted on top (i.e., where a human head might normally be positioned on a torso). Though audio system and speaker 102 may preferably be sized so as to correspond to the size of an "average" human, it is indeed conceivable to tailor its size so as to correspond to a wide range of different human "sizes" and/or vehicle interior spaces.

Audio system and speaker 102 will preferably be safely secured to the front passenger car seat using seat-belts and additional straps that go around the back of the seat. It can receive power via a cable from the car's cigarette lighter. It may preferably have a soft, rubberized coating to prevent any damage to the car's interior. It may preferably have a more or less flat frequency response from 150 Hz to 15 kHz.

Speech data for the audio system and speaker 102 are prefereably stored in the laptop computer 104 in a standard pcm or other compatible format. The data will preferably be embodied by recordings of several representative male and female subjects who have read a given script in a relatively quiet environment. If it is desirable to account for the "Lombard effect", which influences speech characteristics under the influence of background noise, the subjects will preferably have worn headphones during the recording sessions to listen to prerecorded car noise and accordingly be encouraged to issue utterances in such a manner that typical background car noise is accounted for. Different noise files could be prepared for different car speeds in this manner. The content of the script read by the human subjects is determined by the particular application under consideration.

The audio system and speaker 102 will preferably play back the sentences with a fixed pause in between the sentences. The sound levels during the pause period and the speech period will preferably represent the noise level and the signal level, respectively, which are used to compute the SNR value, as explained in the next paragraph. The speech played back by the audio system and speaker 102 is thence preferably picked up by microphone 106. The cellular transmission unit 108 will preferably transmit this signal to the receiver 112 at the server side, utilizing a cellular channel. The speech is decoded using the speech recognizer 118. The scripts used for recording the male and female subjects are preferably available to speech recognizer 118 as well. A comparison of this script with the decoded output of the recognizer indicates the recognition accuracy score.

The level meter 114 built into the server 110 will preferably be configured to measure the overall sound level in a given interval. During the pause period, the level meter indicates the background noise level, n, during that interval. Similarly, during the presence of speech it determines (then records or displays) the speech signal level, s. The ratio s/n is the signal-to-noise ratio (SNR). The final step is to compare the recognition score and the SNR against a set of pre-specified standards to determine the acceptability of the speech recognizer. Note that the recognition score and the SNR value could, if so desired, be forwarded back to an individual in the vehicle conducting these experiments, via a speech synthesizer over the cellular network. If another level meter (in addition to the one in the server) were to be incorporated directly at the output of the microphone 106 in the car, the SNR value in the car could be computed prior to the possible degradation introduced by the cellular network.

As to calculating the recognition score and SNR value, the recognition score is typically c/t, where c is the number of correctly interpreted commands and t is the total number of commands issued. As already explained, the SNR is s/n, where s is the signal level and n represents the noise level. SNR is typically expresssed in decibels. These definitions of recognition score and SNR follow commonly accepted conventions.

Preferably, before beginning the recognition trials, the Robotalk arrangement described heretofore will be calibrated for proper volume setting with the help of a standard sound source and a sound pressure level meter, as depicted in FIGS. 2-5.

Figure 2:
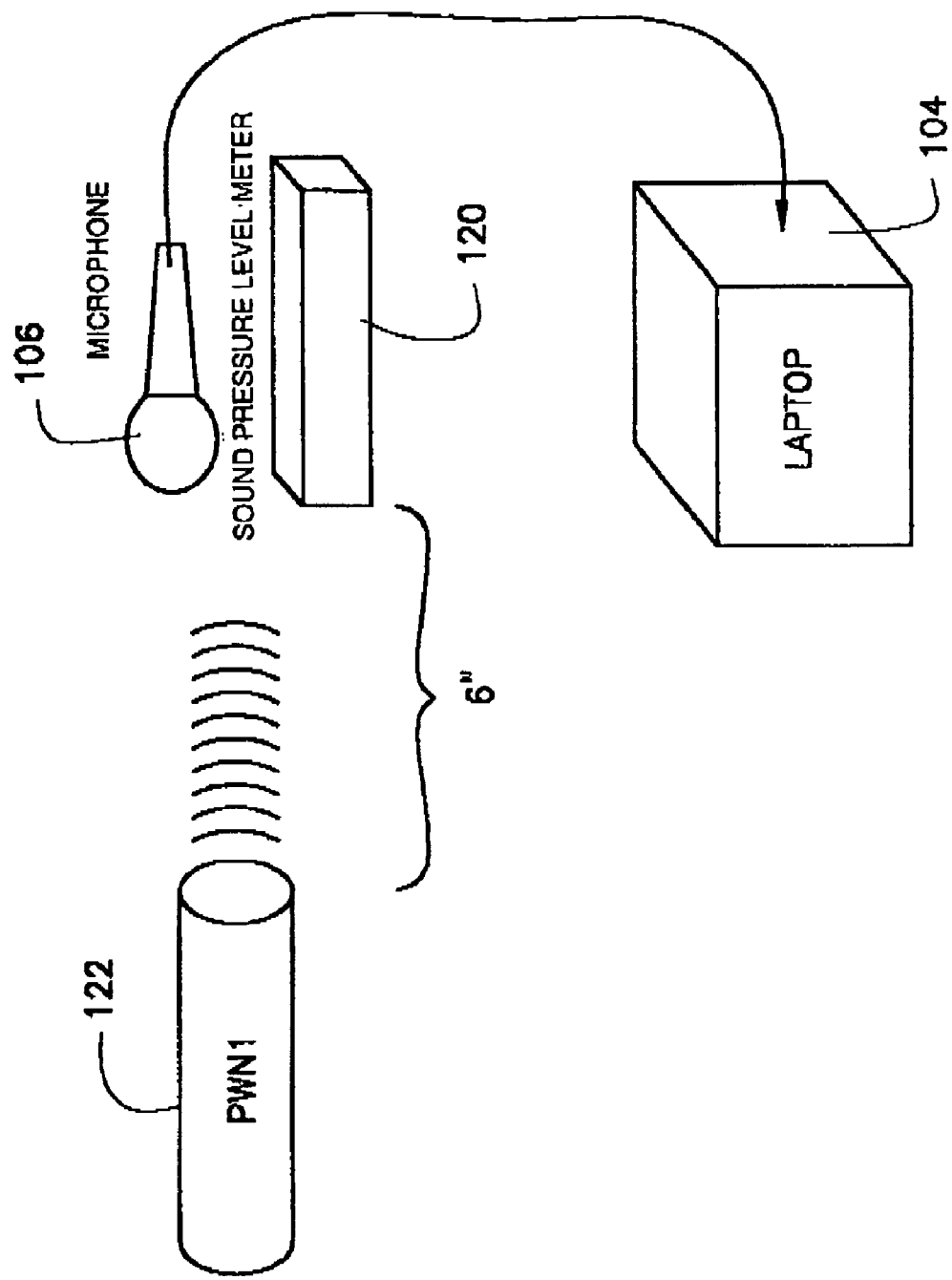
FIGS. 2-5 successively illustrate, in schematic form, a calibration process.

Accordingly, as shown in FIG. 2, a sound pressure level meter 120, such as a Goldline SPL120L sound pressure level meter, is preferably placed next to microphone 106. A sound source 122, such as Goldline model PWN1 sound source, is preferably placed at a suitable distance (e.g., 6 inches) from the microphone 106, and particularly at a point where a speaker's mouth will be. The sound pressure level is then preferably measured and noted. A predetermined amount of this tone (e.g., 30 seconds of it) is preferably recorded from sound source 122. This will then preferably serve as the "calibration file" for the set of speech recordings at hand, which can essentially be stored anywhere (e.g. in laptop 104).

Figure 3:
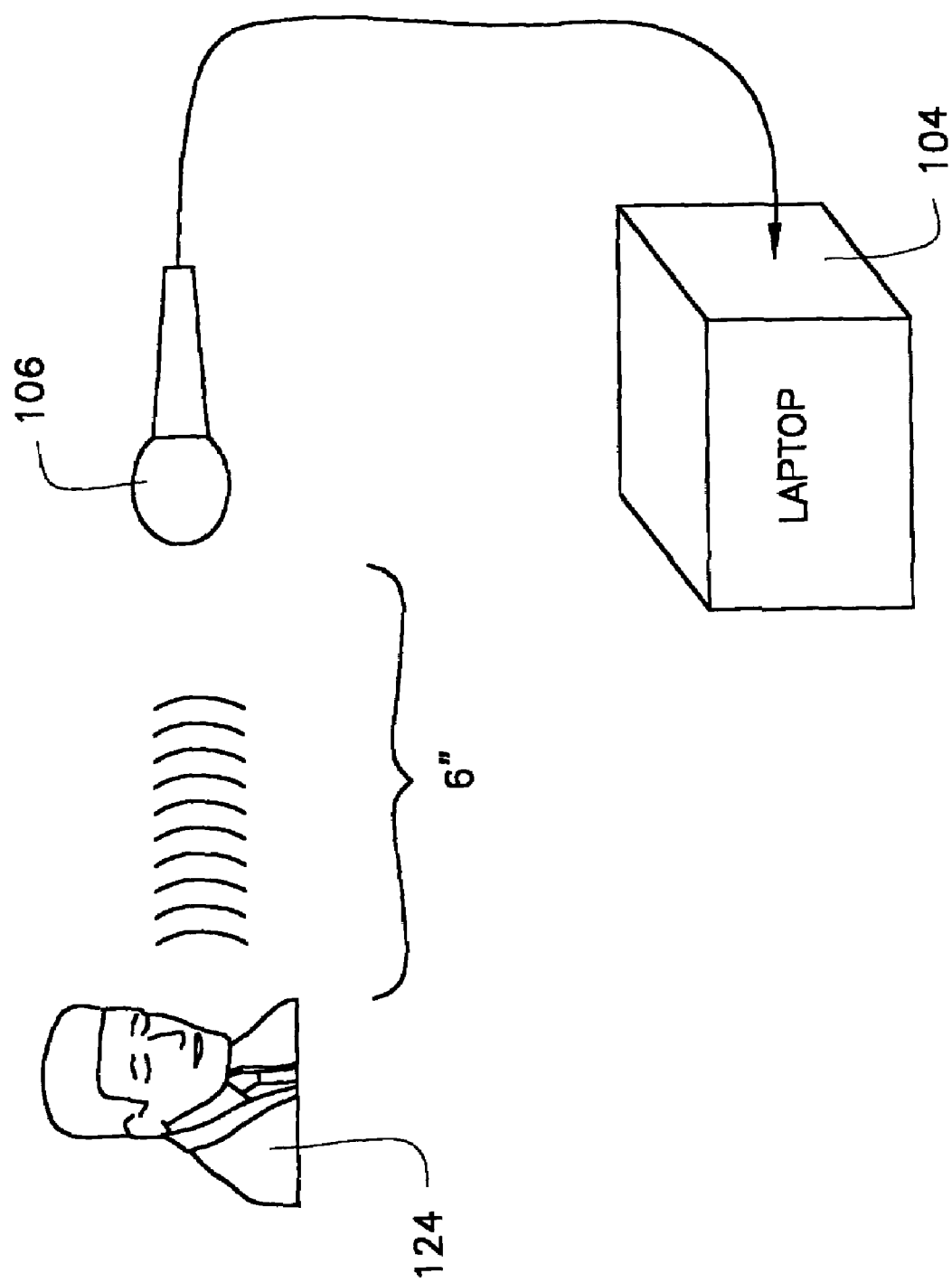

As shown in FIG. 3, speakers (i.e., speaking subjects) 124 will preferably be placed at the same distance from the microphone 106 (e.g., 6 inches) as was the sound source 122 previously (see FIG. 2).

Figure 4:
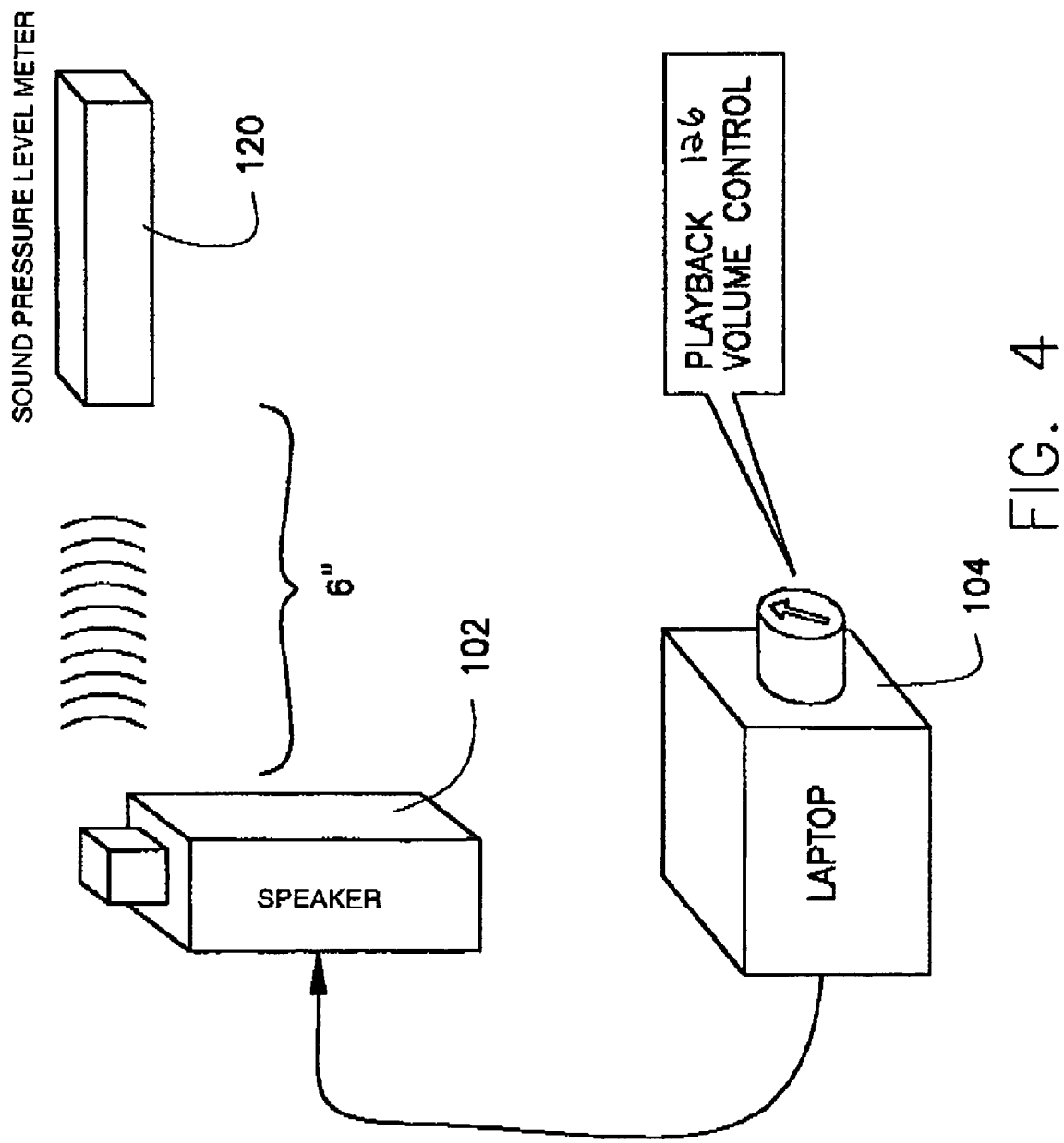

As shown in FIG. 4, the "Robotalk" audio system and speaker 102 may preferably be placed in a position corresponding to a typical passenger position. Via laptop 104, the aforementioned calibration file is preferably playbed back through audio system and speaker 102 with sound pressure level meter 120 being positioned at the "established" distance (e.g., six inches) therefrom. Playback volume control 126 on laptop 104 can then preferably be adjusted so the sound pressure level meter 120 attains the same level noted previously "in the studio" with speaker subjects 124 (see FIG. 3).

Figure 5:
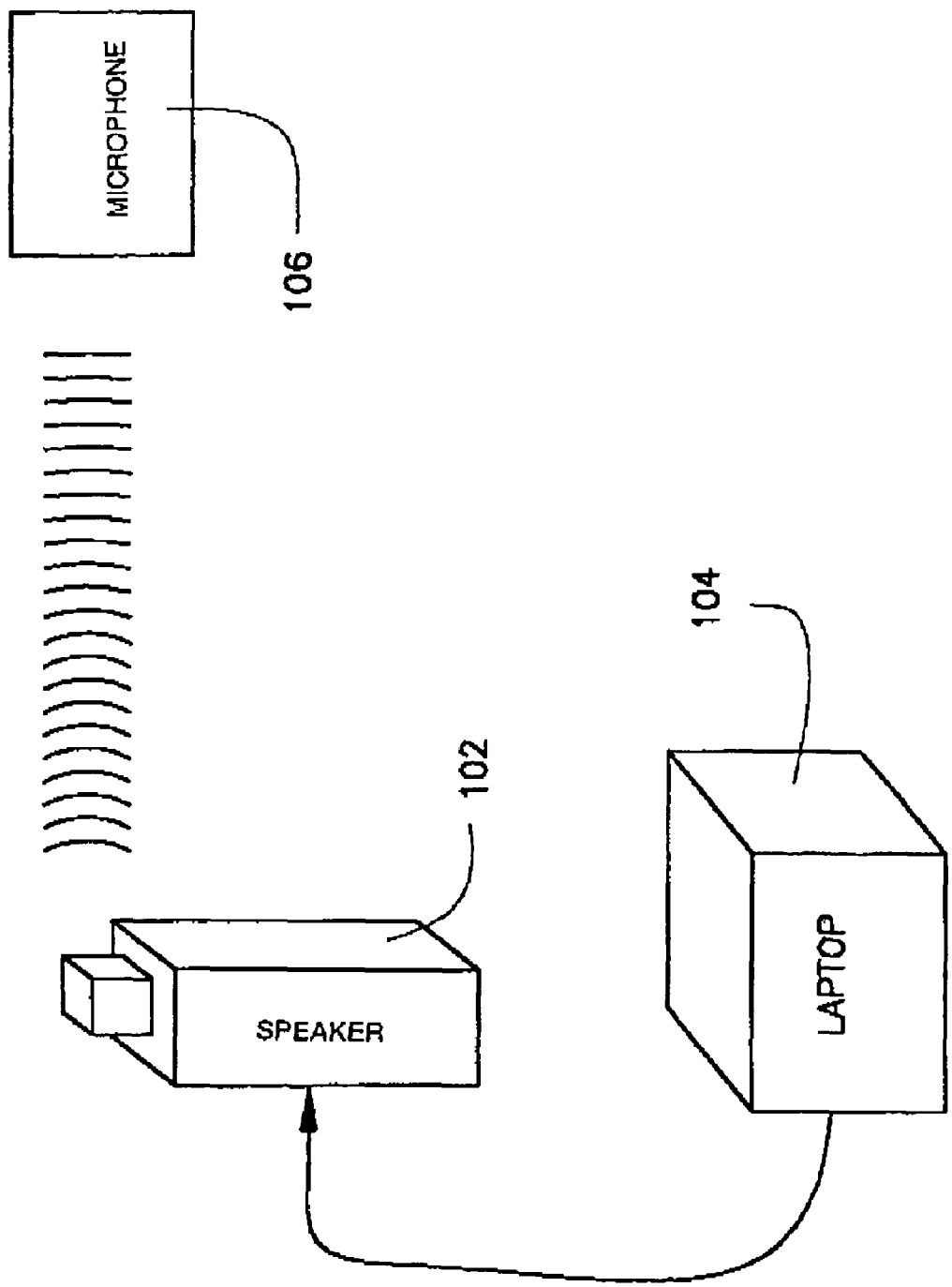

Finally, as shown in FIG. 5, audio files are preferably played back from laptop 104 through audio and speaker system 102 without changing any levels. These will then be at the same level as the original voices of speaker subjects 124 (see FIG. 3). Microphone 106 will pick up the output from audio and speaker system 102.

The application of the Robotalk system towards the testing of an automotive speech recognizer can be appreciated by the following non-restrictive and illustrative example. Suppose one wants to see if the speech recognizer accuracy meets certain performance specifications at three different speeds (e.g., 0-, 30- and 60-mph) in a certain model of a car. For quality control, one might run the recognition test in every one-hundredth car that leaves the assembly line. The designated vocabulary is comprised of a set of commands.

The preparatory step for this application could involve recruiting a set of representative subjects whose recordings would be used repeatedly for all the tests. Some "common sense" criteria may be applied to select these subjects. For instance, it is usually desirable to choose more or less equal number of subjects from both genders. Another usual practice is to avoid subjects with heavy accents. The total number of subjects could preferably be at least on the order of 20 or so. The setup is preferably calibrated as described heretofore in connection with FIGS. 2-5. The subjects will preferably read a script that includes the set of commands of interest. If one wishes not to consider the Lombard effect, then one set of recordings would suffice. Otherwise, recordings are preferably conducted among the subjects three times each, corresponding to three different speeds, each time asking the subjects to wear a headset which plays typical automobile noise at 0-, 30- and 60-mph speeds. The recordings are preferably carried out in a quiet environment utilizing high-fidelity audio equipment. The laptop (indicated at 104 in FIG. 1) preferably will then contain these recordings in a standard digital format.

After these preparatory steps, one may proceed with the tests as follows; reference is again made to FIG. 1. The mobile client 100 is preferably carried in the car and driven at the desired speed. The audio system and speaker 102 reproduces the speech stored in the laptop 104. For instance, the test at the 30-mph speed will involve playing back the speech recorded when 30-mph noise was played back at the headset. The speech samples are preferably played back with some preset pause intervals in between.

The speech transmitted via the cellular channel (at 108) is decoded by the speech recognizer 118 and the decoded text output is compared with the known script. This comparison yields the recognition accuracy. The level meter reading (at 114) during the pause intervals correspond to the noise level, n. The level meter reading during the speech playback is the signal level, s. The signal-to-noise ratio equals s/n. Thus both signal-to-noise ratio and recognition accuracy are computed at 116. These values are compared with the desired specifications to determine whether the automotive speech recognizer installed in a car performs satisfactorily.

Figure 6:
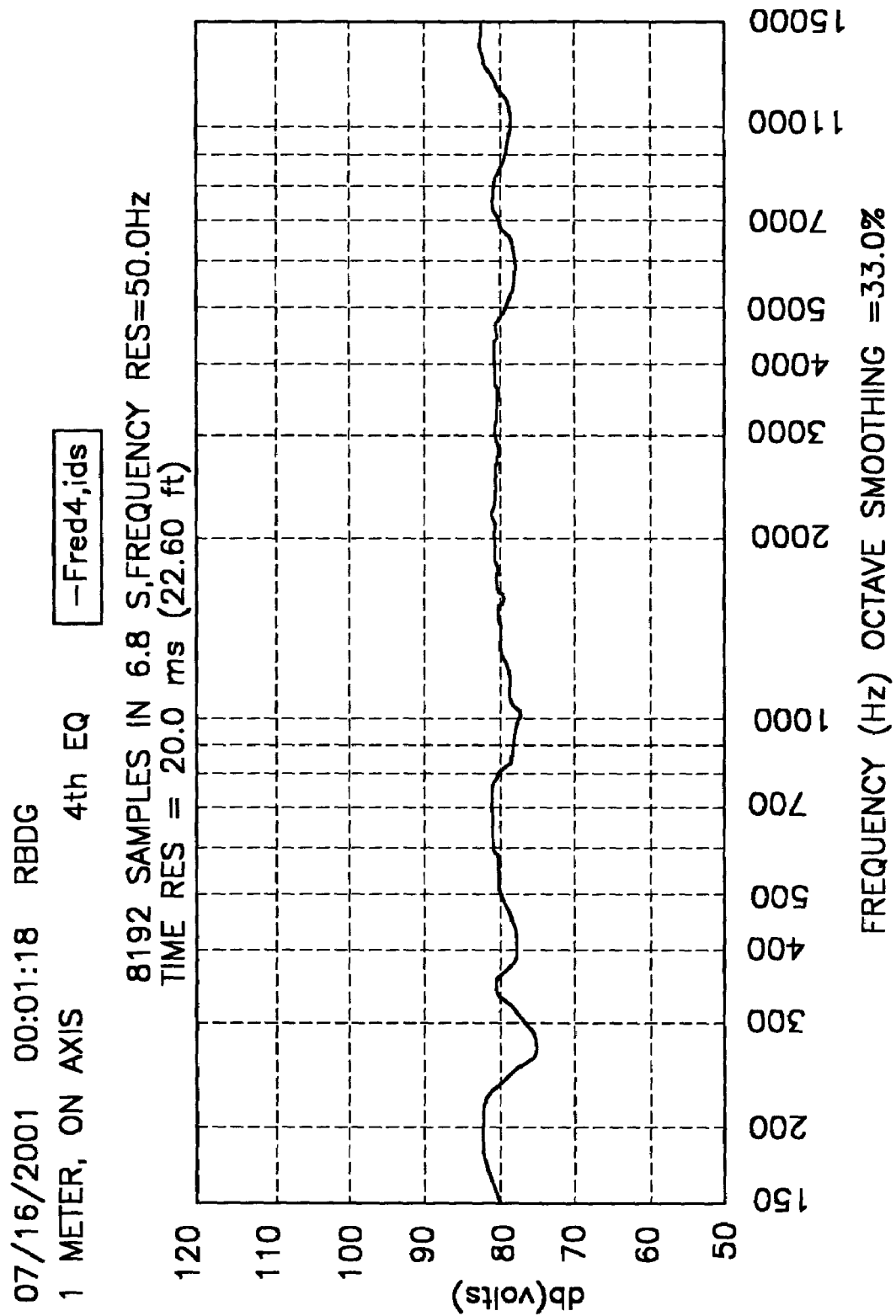
FIG. 6 is a graph illustrating playback frequency response.

FIG. 6 shows an exemplary playback frequency response. The response is shown graphically with decibels(volts) on the y-axis and frequency (Hz) octave smoothing on the x-axis. As can be seen by the graph, the decibel level of the stereo remained relatively constant regardless of the frequency of the output.

Note that after the initial preparatory steps of recording a pool of subjects, the whole process is automated, resulting in significant time and cost savings. In addition, as the same speech is played back in each vehicle under study, the results are generally reproducible and reliable.

In brief recapitulation, there is broadly contemplated herein, in accordance with at least one presently preferred embodiment of the present invention, a system and method for testing the performance of a mobile speech recognition system, such as in an automobile or other vehicle, in a convenient and reliable manner. In contrast to conventional procedures, where a-group of speakers is needed for testing each vehicle, the embodiments of the present invention present the advantage of utilizing a fixed set of recordings for all trials. Thus, significant cost savings are realized. In addition, the test results are generally more reliable.

It is to be understood that the present invention, in accordance with at least one presently preferred embodiment, includes a speaker arrangement which propagates speech output and a testing arrangement adapted to test the accuracy of speech input associated with the speech output propagated by the speaker arrangement. Together, these components may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for testing speech recognition in a new vehicle, said apparatus comprising:
   a laptop computer;
   a speaker arrangement which propagates a speech output based on a known text previously recorded by a human; wherein the text is comprised of a set of commands of interest, said speech output being stored digitally in a laptop computer;
   a testing arrangement adapted to test the acceptability of installed speech recognition systems in vehicles while the vehicles are being operated on a roadway at speeds of 0, 30, and 60 miles per hour, wherein the acceptability of a particular vehicular speech recognition system is based upon a comparison of pre-specified standards of recognition accuracy and signal-to-noise ratio values with a recognition accuracy value and a signal-to-noise ratio value produced by the particular vehicular speech recognition system, based on the text recognized from the speech output and the testing arrangement is located separate from the vehicle being tested, the propagated speech output being transmitted to the testing arrangement via a cellular transmission unit located within the vehicle being tested;
   wherein said speaker arrangement is configured to simulate the propagation of a human voice and is calibrated with respect to an audio input of an installed speech recognition system in a vehicle such that the speech output is propagated at the same pressure and distance from a microphone used to record the human speech;

wherein the speech output comprises three recordings of the human voice, one recording having been made while the human wore a headset playing noise typical of an automobile operating on a roadway at a speed of 0 miles per hour, one recording having been made while the human wore a headset playing noise typical of an automobile operating on a roadway at a speed of 30 miles, and one recording having been made while the human wore a headset playing noise typical of an automobile operating on a roadway at a speed of 60 miles per hour;

wherein the recording having been made while the human wore a headset playing noise typical of an automobile operating on a roadway at a speed of 0 miles per hour is played during the test when the vehicle is being operated on a roadway at a speed of 0 miles per hour;

wherein the recording having been made while the human wore a headset playing noise typical of an automobile operating on a roadway at a speed of 30 miles per hour is played during the test when the vehicle is being operated on a roadway at a speed of 30 miles per hour;

wherein the recording having been made while the human wore a headset playing noise typical of an automobile operating on a roadway at a speed of 60 miles per hour is played during the test when the vehicle is being operated on a roadway at a speed of 60 miles per hour; and wherein the apparatus is used to test every one-hundredth car that leaves an assembly line.

2. The apparatus according to claim 1, wherein said speaker arrangement is configured to propagate speech output from a position corresponding to the mouth of an average-sized human seated in the vehicle.

3. The apparatus according to claim 2, wherein said speaker arrangement is dimensioned to be seated on a vehicle seat and to propagate speech output from a position corresponding to the mouth of an average-sized human seated in the vehicle.

4. The apparatus according to claim 3, wherein said speaker arrangement comprises a torso portion and a head portion, said torso portion being dimensioned substantially similar to an average human torso and said head portion being dimensioned substantially similarly to an average human head, wherein speech output propagates from said head portion from a position corresponding to a human mouth.

5. The apparatus according to claim 1, wherein said testing arrangement is integrable with a receiver arrangement adapted to pick up speech output from said speaker arrangement.

6. The apparatus according to claim 1, wherein said testing arrangement comprises a speech recognizer.

7. The apparatus according to claim 6, wherein said testing arrangement is further adapted to calculate a speech recognition score.

8. The apparatus according to claim 6, wherein said testing arrangement is further adapted to calculate a signal-to-noise ratio.

9. The apparatus according to claim 1, wherein said speaker arrangement is adapted to propagate prerecorded speech output.

10. A method of testing speech recognition in a new vehicle, said method comprising:

propagating a speech output via a speaker arrangement based on a known text previously recorded by a human; wherein the text is comprised of a set of commands of interest, said speech output being stored digitally in a laptop computer disposed within the new vehicle;

testing the acceptability of installed speech recognition systems in vehicles via a testing arrangement while the vehicles are being operated on a roadway at speeds of 0, 30, and 60 miles per hour, wherein the acceptability of a particular vehicular speech recognition system is based upon a comparison of pre-specified standards of recognition accuracy and signal-to-noise ratio values with a recognition accuracy value and a signal-to-noise ratio value produced by the particular vehicular speech recognition system, based on the text recognized from the speech output and the testing arrangement is located separate from the vehicle being tested, the propagated speech output being transmitted to the testing arrangement via a cellular transmission unit located within the vehicle being tested;

wherein said speaker arrangement is configured to simulate the propagation of a human voice and is calibrated with respect to an audio input of an installed speech recognition system in a vehicle such that the speech output is propagated at the same pressure and distance from a microphone used to record the human speech;

wherein the speech output comprises three recordings of the human voice, one recording having been made while the human wore a headset playing noise typical of an automobile operating on a roadway at a speed of 0 miles per hour, one recording having been made while the human wore a headset playing noise typical of an automobile operating on a roadway at a speed of 30 miles, and one recording having been made while the human wore a headset playing noise typical of an automobile operating on a roadway at a speed of 60 miles per hour;

wherein the recording having been made while the human wore a headset playing noise typical of an automobile operating on a roadway at a speed of 0 miles per hour is played during the test when the vehicle is being operated on a roadway at a speed of 0miles per hour;

wherein the recording having been made while the human wore a headset playing noise typical of an automobile operating on a roadway at a speed of 30 miles per hour is played during the test when the vehicle is being operated on a roadway at a speed of 30 miles per hour;

wherein the recording having been made while the human wore a headset playing noise typical of an automobile operating on a roadway at a speed of 60 miles per hour is played during the test when the vehicle is being operated on a roadway at a speed of 60 miles per hour; and wherein the method is used to test every one-hundredth car that leaves an assembly line.

11. The method according to claim 10, wherein said simulating step comprises propagating speech output from a position corresponding to the mouth of an average-sized human seated in the vehicle.

12. The method according to claim 11, further comprising:

providing a speaker arrangement to perform said propagating step;

dimensioning said speaker arrangement to be seated on a vehicle seat and to propagate speech output from a position corresponding to the mouth of an average-sized human seated in the vehicle.

13. The method according to claim 12, wherein said step of providing a speaker arrangement comprises providing a torso portion and a head portion, said torso portion being dimensioned substantially similar to an average human torso and said head portion being dimensioned substantially similarly to an average human head, wherein speech output propagates from said head portion from a position corresponding to a human mouth.

14. The method according to claim 10, further comprising the steps of:
providing a testing arrangement to perform said testing step; and
integrating said testing arrangement with a receiving arrangement adapted to pick up propagated speech output.

15. The method according to claim 10, wherein said testing step comprises the step of performing speech recognition.

16. The method according to claim 15, wherein said testing step comprises calculating a speech recognition score.

17. The method according to claim 15, wherein said testing step comprises calculating a signal-to-noise ratio.

18. The method according to claim 10, wherein said propagating step comprises propagating prerecorded speech output.

19. A program storage device readable by machine, tangibly embodying a program of instructions executable by the machine to perform method steps for testing speech recognition in a new vehicle, said program storage device comprising:
propagating a speech output via a speaker arrangement based on a known text previously recorded by a human; wherein the text is comprised of a set of commands of interest, said speech output being stored digitally in a laptop computer disposed within the new vehicle;
testing the acceptability of installed speech recognition systems in vehicles via a testing arrangement while the vehicles are being operated on a roadway at speeds of 0, 30, and 60 miles per hour, wherein the acceptability of a particular vehicular speech recognition system is based upon a comparison of pre-specified standards of recognition accuracy and signal-to-noise ratio values with a recognition accuracy value and a signal-to-noise ratio value produced by the particular vehicular speech recognition system, based on the text recognized from the speech output and the testing arrangement is located separate from the vehicle being tested, the propagated speech output being transmitted to the testing arrangement via a cellular transmission unit located within the vehicle being tested;
wherein said speaker arrangement is configured to simulate the propagation of a human voice and is calibrated with respect to an audio input of an installed speech recognition system in a vehicle such that the speech output is propagated at the same pressure and distance from a microphone used to record the human speech;
wherein the speech output comprises three recordings of the human voice, one recording having been made while the human wore a headset playing noise typical of an automobile operating on a roadway at a speed of 0 miles per hour, one recording having been made while the human wore a headset playing noise typical of an automobile operating on a roadway at a speed of 30 miles. and one recording having been made while the human wore a headset playing noise typical of an automobile operating on a roadway at a speed of 60 miles per hour;
wherein the recording having been made while the human wore a headset playing noise typical of an automobile operating on a roadway at a speed of 0 miles per hour is played during the test when the vehicle is being operated on a roadway at a speed of 0miles per hour;
wherein the recording having been made while the human wore a headset playing noise typical of an automobile operating on a roadway at a speed of 30 miles per hour is played during the test when the vehicle is being operated on a roadway at a speed of 30 miles per hour;
wherein the recording having been made while the human wore a headset playing noise typical of an automobile operating on a roadway at a speed of 60 miles per hour is played during the test when the vehicle is being operated on a roadway at a speed of 60miles per hour; and
wherein the method is used to test every one-hundredth car that leaves an assembly line.

* * * * *